May 21, 1963 R. J. HOTCHKISS, JR 3,090,447
COMBINATION DISC HARROW AND TOOTH DRAG ATTACHMENT
Filed Dec. 15, 1959 3 Sheets-Sheet 1

INVENTOR.
ROBERT J. HOTCHKISS JR.
BY
McMorrow, Berman + Davidson
ATTORNEYS

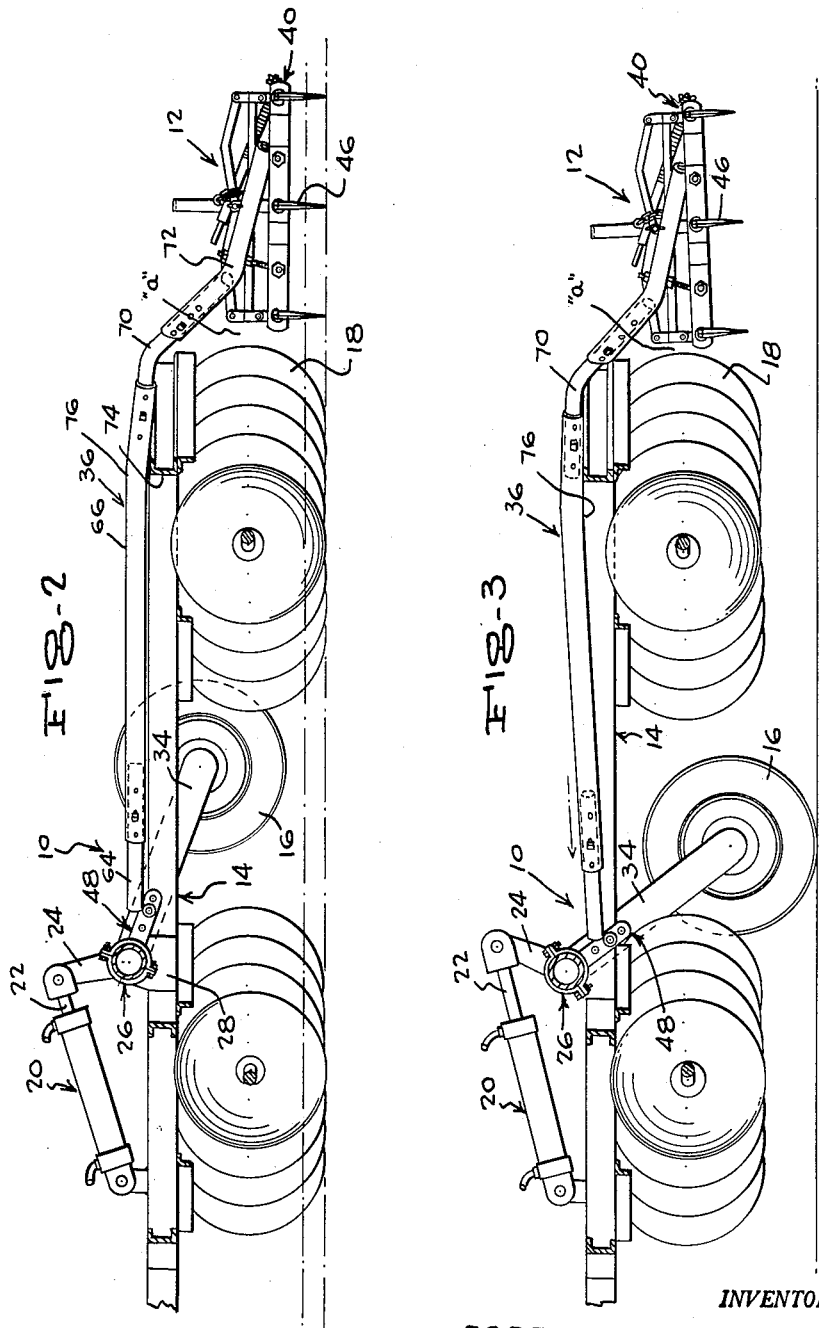

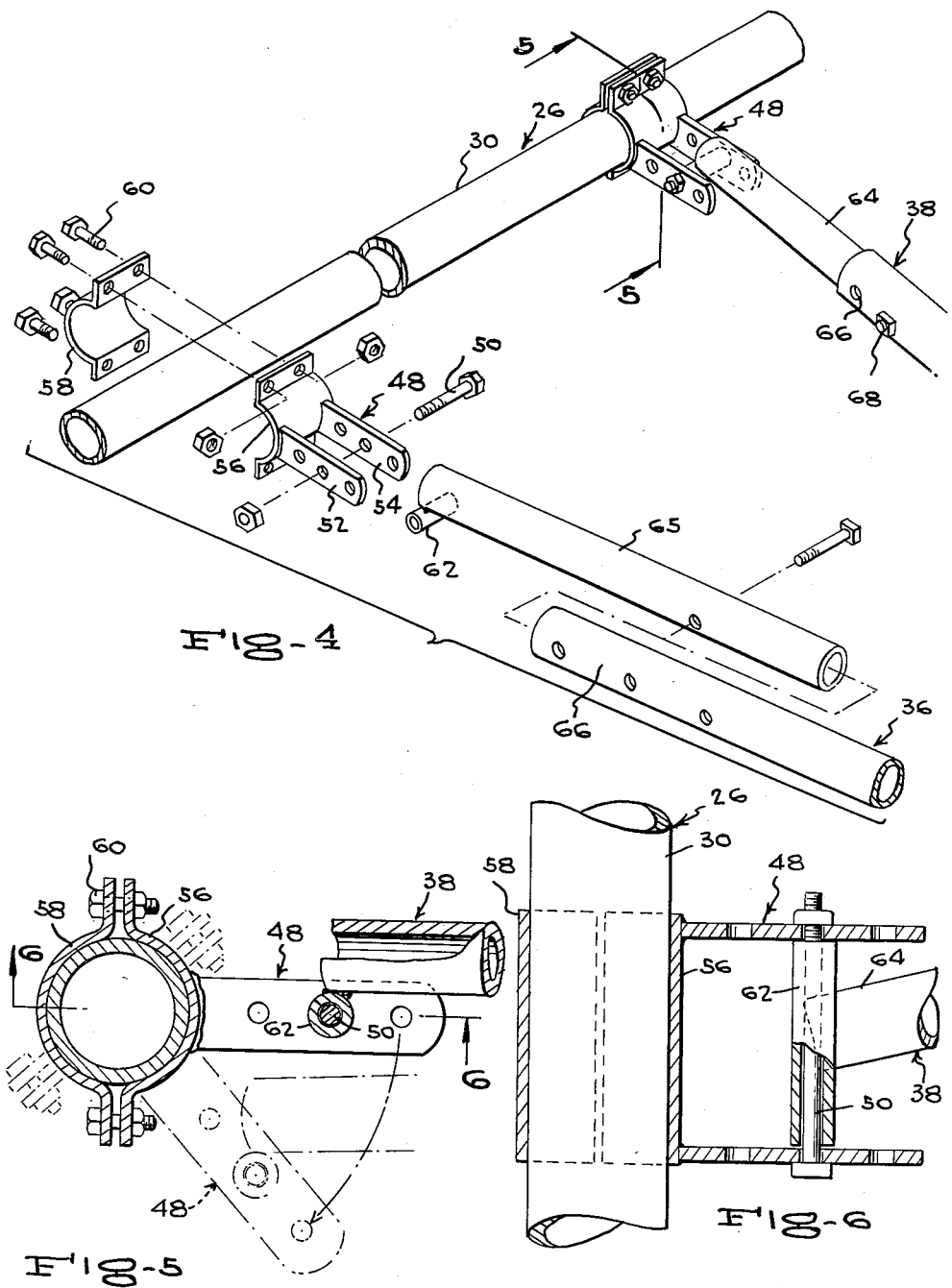

United States Patent Office 3,090,447
Patented May 21, 1963

3,090,447
COMBINATION DISC HARROW AND TOOTH DRAG ATTACHMENT
Robert J. Hotchkiss, Jr., % Hotchkiss Steel Products Co., Bradford, Ill.
Filed Dec. 15, 1959, Ser. No. 859,804
4 Claims. (Cl. 172—178)

The present invention relates to a combination disc harrow and tooth drag attachment.

Presently in use are disc harrows to which are frequently connected tooth drag attachments for trailing movement therebehind while working the soil. Generally, such harrows are provided with a pair of transporting wheels which are normally spaced above a ground surface when the harrow is in the soil working position and which may be shifted to a ground-engaging position for travel over a roadway or between areas of soil to be worked with the harrow elevated out of the soil working position. Power means is employed, in such a harrow, for shifting the transporting wheels between the aforesaid positions.

As it is always desirable to lift the tooth drag attachment with the harrow when the transport wheels are lowered to the ground-engaging position, a suitable connection or attaching means must be provided so that elevating movement of the harrow effects the elevating movement of the tooth drag attachment. A preferred form of the connecting or attaching means consists in a pair of draw bars extending over the frame of the harrow and having their forward ends connected to the wheel carrying element of the harrow and having their rearward ends connected to the tooth drag attachment. Upon elevating movement of the frame of the harrow, the frame engages the draw bars to effect the elevation of the tooth drag attachment. When the harrows are in the soil working position, it is most desirable that the draw bars be not engaged or supported upon the harrow frame so as to permit the tooth drag attachment to work the soil to the predetermined depth as controlled by the weight of the attachment or by downward pressure applied thereto by suitable means. This obviously requires a lost motion connection between the draw bars and the harrow frame which motion is taken up when the harrow is elevated, resulting in less elevational movement of the attachment relative to the harrow.

An object of the present invention is to provide a combination disc harrow and tooth drag attachment in which the harrow has transport wheels shiftable between a ground-engaging position and a position out of engagement with the ground for elevating the harrow, with means connecting the attachment to the harrow for elevating the attachment simultaneously with the harrow to an optimum heighth with respect to the harrow.

Another object of the present invention is to provide a combination disc harrow and tooth drag attachment in which the harrow has transport wheels shiftable between a ground-engaging position and a position out of engagement with the ground for elevating the harrow, with means connecting the attachment to the harrow for elevating the attachment simultaneously with the harrow and to an optimum heighth with respect to the harrow, such connection means also effecting movement of the attachment forwardly toward the harrow while being elevated.

A further object of the present invention is to provide a combination disc harrow and tooth drag attachment in which the harrow has transport wheels shiftable between a ground-engaging position and a position out of engagement with the ground for elevating the harrow, with means connecting the attachment to the harrow for elevating the attachment simultaneously with the harrow and to an optimum heighth with respect to the harrow, the elevating movement being augmented by means provided in the specific design of the portions of the draw bars engaged by the frame of the harrow.

A still further object of the present invention is to provide a combination disc harrow and tooth drag attachment having means for raising the harrow and attachment out of the ground-working position to a position elevated above the ground for transport of the harrow and attachment over a roadway or between areas of soil to be worked, the harrow and attachment being elevated simultaneously as a unit with the teeth of the attachment elevated above the ground surface to a degree heretofore not possible and with positive means effecting such elevation.

Yet another object of the present invention is to provide a combination disc harrow and tooth drag attachment in which the draw bars of the attachment are pivotally connected to the wheel carrying element of the harrow, such pivotal connection permitting movement of the attachment relative to the harrow both horizontally and vertically.

These and other object and advantages of the present invention will be fully apparent from the following description when taken in conjunction with the annexed drawings, in which:

FIGURE 2 is a view taken on the line 2—2 of FIGURE 1, the transporting wheels being shown in the elevated position;

FIGURE 3 is a view similar to FIGURE 2, with the transporting wheels being shown in the ground-engaging position;

FIGURE 4 is an isometric exploded view of the components of the pivotal connection of the draw bar of the attachment to the wheel carrying element of the disc harrow;

FIGURE 5 is a view on an enlarged scale, taken on the line 5—5 of FIGURE 4, the dotted line shown indicating the pivotal movement of the bracket member secured to the wheel carrying element; and FIGURE 6 is a view taken on the line 6—6 of FIGURE 5.

Figure 1:
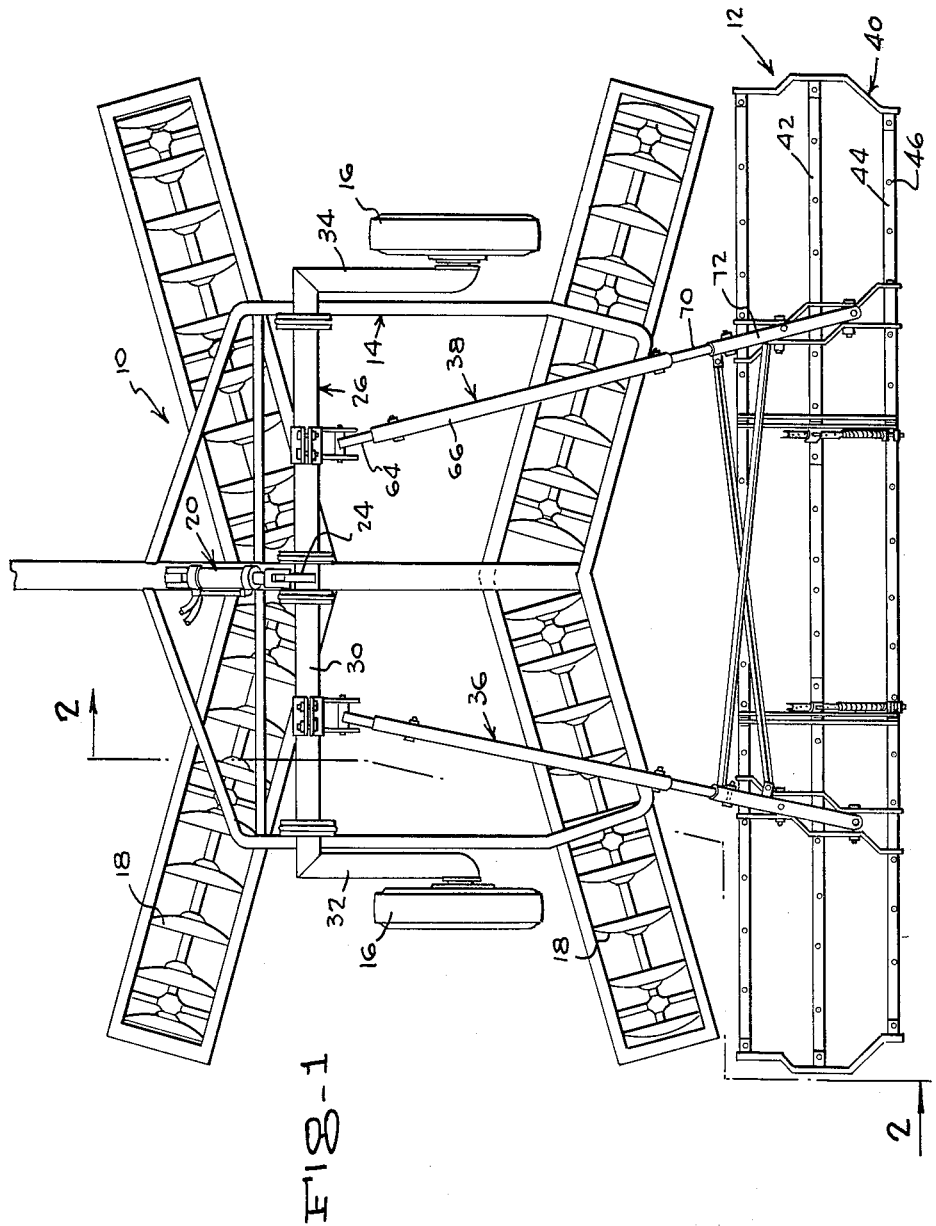
FIGURE 1 is a top plan view of the combination disc harrow and tooth drag attachment of the present invention.

With reference to FIGURES 1 to 3, inclusive, a disc harrow is designated generally by the reference numeral 10 and a tooth drag attachment by the numeral 12. The harrow 10 includes a frame 14 having a forward end and a rearward end. A pair of transporting wheels 16 is positioned transversely of the frame 14 between the forward end and the rearward end of the latter and are normally spaced above a ground surface, as in FIGURE 2, when the discs 18 of the harrow 10 are in a ground-working position.

Means is provided operatively connected to the wheels 16 for effecting movement of the wheels 16 from the elevated normal position to the transporting or ground-engaging position, as in FIGURE 3. Specifically, this means consists in a hydraulic cylinder assembly 20 having its actuating arm 22 pivotally connected to the upper end of an arm 24 projecting upwardly and having its lower end secured to the midpart of a wheel carrying element 26.

The wheel-carrying element 26 is rotatively connected to the frame 14 about a transverse horizontal axis or plurality of trunnions 28 projecting upwardly from the frame 14, for pivotal movement of the transporting wheels from the normal position to a position in which the wheels are in a transporting position on a ground surface.

The element 26 is U-shaped in configuration with its bight 30 transversely of the frame 14 and its legs 32 and 34 longitudinally of the frame 14. The wheels 16 are mounted in the free ends of the legs 32 and 34 by conventional axle means, the latter not being shown in detail as not forming a part of the present invention.

The tooth drag attachment 12 is positioned transversely of the frame 14 and rearwardly of the rearward end of the frame 14. The attachment 12 includes lift support means or at least two draw bars 36 and 38 arranged in lateral spaced relation, a tooth unit 40 including at least two tooth carrying bars 42 and 44 arranged in tandem spaced relation with each bar 42 and 44 having a plurality of teeth 46 arranged in spaced relation therealong and carried by the tooth carrying bar 42 or 44. The unit 40 is positioned transversely of the draw bars 36 and 38 and is carried by the draw bars 36 and 38. The drawbars 36 and 38 are disposed so as to extend horizontally over the harow frame 14 and bear intermediate their ends upon a cross frame member 74 on the rearward end of the harrow frame 14, and have one of the complemental ends adjacent the wheel-carrying element 26 and have the other of the complemental ends overhanging the rearward end of the harrow frame 14 and adjacent the tooth unit 40.

Means is provided, by the present invention, connecting the draw bars 36 and 38 to the wheels 16 and to the frame 14 so that, upon movement of the wheels 16 from the normal elevated position to the transporting position, the draw bars 36 and 38 will fulcrum about the rearward end of the frame 14. Also, upon execution of the movement of the wheels 16 from the normal elevated position to the transporting position, the draw bars 36 and 38 will be supported by or fulcrum about and slide along the rearward end of the frame 14.

Specifically, this connecting means is an eccentric means and consists in a bracket member 48 and a pivot pin 50 connecting the aforesaid complemental one ends or ends of the draw bars 36 and 38 remote from the unit 40 to the wheel carrying element 26 for fore-and-aft swinging movement of said ends of said drawbars about the transverse horizontal axis or plurality of trunnions 28.

Each of the bracket members 48 consist of a pair of bars 52 and 54 arranged in lateral spaced relation and having their adjacent one ends fixedly secured by welding or other means to the exterior surface of a semicylindrical sleeve member 56, which with another semicylindrical sleeve member 58 is frictionally secured to the bight 30 of the element 26 by means of bolt and nut assemblies 60.

The pivotal connection of each of the draw bars 36 and 38 to the element 26 includes a sleeve 62 having an inside diameter substantially equal to or slightly more more than the diameter of the pivot pin 50, the sleeve 62 being fixedly secured by welding or other means to the underside and adjacent one end of a draw bar section 64 telescopingly arranged within a second draw bar section 66. A bolt and nut assembly 68 adjustably secures the section 64 within one end of the section 66.

A third draw bar section 70, bent to an elbow, has the portion adjacent one end telescopingly arranged within the other end of the draw bar section 66, in each of the draw bars 36 and 38. A fourth draw bar section 72 has one end telescopingly receiving the other end portion of the third draw bar section 70, in each of the draw bars 36 and 38, and is secured at its other end to the unit 40. The draw bar section 72 is also elbow-shaped, as shown most clearly in FIGURES 2 and 3.

In operation, when it is desired to shift the wheels 16 from the normal elevated position (FIGURE 2) to the ground-engaging position (FIGURE 3) in which the harrow disc 18 are out of soil-working position, hydraulic fluid under pressure is admitted to one end of the hydraulic cylinder assembly 20 so as to effect the extension of the hydraulic cylinder arm 22 to cause rotation of the bight 30 of the element 26. This shifts the wheels 16 to the ground-engaging position and simultaneously lifts the disc harrow 10 above the ground surface.

As shown in FIGURE 2, the draw bar section 66 of the draw bar 36 is bent downwardly inwardly of its rearward end at a slight angle. The section 66 is in crisscross relation with respect to the cross frame member 74 of the frame 14 at a point immediately rearwardly of the bend in the section 66, the bend area being designated by the reference numeral 76.

Upon rotation of the bight 30, in the clockwise direction as shown in FIGURES 2 and 3, the bracket members 48 which support the draw bars 36 and 38 effect downward movement of the draw bar section 64 and also forward movement of the section 64, pulling the draw bars 36 and 38 forwardly over the cross frame member 74 in effecting forward movement of the tooth drag attachment 12 as well as elevating movement of the tooth drag attachment 12. The elevating movement is caused partially by the raising of the disc 18 and also by the forward movement of the draw bars 36 and 38 as they move forwardly over the cross frame member 74. This forward movement is shown in FIGURES 2 and 3 by the narrowing of the space "a," in FIGURE 2, to the space "a" in FIGURE 3 between the rearmost disc 18 and the forward part of the unit 40.

The elevating movement of the unit 40 is also augmented by the downward slope of the rearward end portion of the draw bar section 66 of each of the draw bars 36 and 38 as each section 66 moves forwardly over the cross frame member 74.

The various sections 64, 66, 70, and 72, together with the adjustability of the section 64 with the bracket 48 of each of the draw bars 36 and 38 permits the adjustment of the draw bars to fit any known make of disc harrow now commercially available or currently proposed. The section 70 may be reversed, as may be the section 66 and all of the telescoping sections adjusted inwardly and outwardly of each other so as to lengthen or shorten the draw bar and, if desired, the section 66 may be provided with a greater angle than that shown at 76 for a particular disc harrow with which the tooth drag attachment is to be employed.

What is claimed is:
1. The combination with a disc harrow including a frame having a forward end and a rearward end, a pair of transporting wheels positioned transversely of said frame between the forward and rearward ends thereof and normally spaced above a ground surface, a wheel-carrying element connecting said wheels together, means rotatively connecting said element to said frame about a transverse horizontal axis for pivotal movement of said wheels from the normal position to a position in which said wheels are in a transporting position on said ground surface, means operatively connected to said element for effecting the movement of said wheels from the normal position to the transporting position, and a cross frame member on the rearward end of said harrow frame, of a tooth drag attachment including at least two drawbars and a tooth unit including at least two tooth-carrying bars each having a plurality of teeth arranged in spaced relation therealong and depending therefrom, said tooth unit being disposed rearwardly of the rearward end of said frame with the drawbars disposed so as to extend horizontally over the frame and bear intermediate their ends upon said cross frame member and having one of the complemental ends adjacent said wheel-carrying element and having the other of the complemental ends overhanging the rearward end of said frame and adjacent said tooth unit, means eccentrically connecting said one complemental ends of said drawbars to said wheel-carrying element for fore-and-aft swinging movement of said one complemental ends about said horizontal axis, and means connecting the other of the complemental ends of said drawbars to said tooth unit for movement with said drawbars, whereby said drawbars in the course of movement of the wheels from the normal position to the transporting position will fulcrum about said cross frame member to thereby elevate said tooth unit with respect to the disc of said harrow.

2. The combination according to claim 1 wherein in addition the drawbars slide forwardly across said cross frame member in the course of movement of the wheels from the normal position to the transporting position to thereby narrow the space between said tooth unit and said harrow.

3. The combination according to claim 1 wherein the parts of said drawbars which bear upon said cross frame member slope downwardly toward said other complemental ends of said drawbars, and said parts of said drawbars in the course of movement of the wheels from the normal position to the transporting position fulcrum about said cross frame member to thereby elevate said tooth unit with respect to the disc of said harrow.

4. The combination according to claim 3 wherein said parts of said drawbars slide forwardly across said cross frame member in the course of movement of the wheels from the normal position to the transporting position to thereby narrow the space between said tooth unit and said harrow.

References Cited in the file of this patent

UNITED STATES PATENTS

| | | |
|---|---|---|
| 158,557 | Williams | Jan. 5, 1875 |
| 328,898 | Lyons | Oct. 20, 1885 |
| 445,507 | Okey | Jan. 27, 1891 |
| 631,598 | Todd | Aug. 22, 1899 |
| 954,759 | Naylor | Apr. 12, 1910 |
| 1,685,278 | Dwyer | Sept. 25, 1928 |
| 2,765,609 | Oehler et al. | Oct. 9, 1956 |
| 2,786,285 | Lindbeck | Mar. 26, 1957 |
| 2,797,542 | Webster et al. | July 2, 1957 |
| 2,881,578 | Oehler et al. | Apr. 14, 1959 |